United States Patent
Jung et al.

(10) Patent No.: US 9,971,083 B2
(45) Date of Patent: May 15, 2018

(54) DIRECTIONAL BACKLIGHT UNIT

(71) Applicant: ELECTRONICS AND TELECOMMUNICATIONS RESEARCH INSTITUTE, Daejeon (KR)

(72) Inventors: Soo Yong Jung, Gwangju (KR); Hee Seung Kim, Gwangju (KR); Sun Goo Lee, Gwangju (KR); Sei Hyoung Lee, Gwangju (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 186 days.

(21) Appl. No.: 14/958,099

(22) Filed: Dec. 3, 2015

(65) Prior Publication Data

US 2016/0161662 A1    Jun. 9, 2016

(30) Foreign Application Priority Data

Dec. 4, 2014  (KR) .................. 10-2014-0173082

(51) Int. Cl.
*F21V 7/04*  (2006.01)
*F21V 8/00*  (2006.01)

(52) U.S. Cl.
CPC .......... *G02B 6/005* (2013.01); *G02B 6/0026* (2013.01); *G02B 6/0028* (2013.01)

(58) Field of Classification Search
CPC .... G02B 6/005; G02B 6/0023; G02B 6/0026; G02B 6/0028; G02B 6/0033; G02B 6/0066; G02B 6/0075
See application file for complete search history.

(56) References Cited

U.S. PATENT DOCUMENTS

| | | | |
|---|---|---|---|
| 5,801,795 A * | 9/1998 | Ogino ................. | G02B 5/1866 348/E9.027 |
| 7,954,967 B2 | 6/2011 | Kashiwagi et al. | |
| 8,743,038 B2 | 6/2014 | Wu et al. | |
| 8,780,178 B2 | 7/2014 | Koh et al. | |
| 9,013,773 B2 | 4/2015 | Bang et al. | |

(Continued)

FOREIGN PATENT DOCUMENTS

KR    10-1495401 B1    2/2015

*Primary Examiner* — Anh Mai
*Assistant Examiner* — Matthew Peerce

(57) ABSTRACT

Provided is a directional backlight unit. The directional backlight unit includes a source light unit configured to generate dot source light, a linear source light generator configured to separate a plurality of source lights, which are output in a direction vertical to a line type output surface, from the dot source light according to different grating periods and generate the separated plurality of source lights as linear source lights, and a light guide panel configured to output backlight, which has a form of flat source lights and includes the plurality of source lights, in a direction vertical to a plate type output surface according to the different grating periods. The linear source light generator includes an incident surface on which the dot source light is incident and the line type output surface on which a plurality of grating patterns having the different grating periods are provided.

11 Claims, 3 Drawing Sheets

(56) References Cited

U.S. PATENT DOCUMENTS

2011/0141395 A1\* 6/2011 Yashiro ................ G02B 6/0036
349/62
2012/0050148 A1 3/2012 Huang et al.
2012/0314145 A1 12/2012 Robinson
2013/0155502 A1 6/2013 Kwak et al.

\* cited by examiner

FIG. 1
PHASE MATCHING IN GRATING REGION
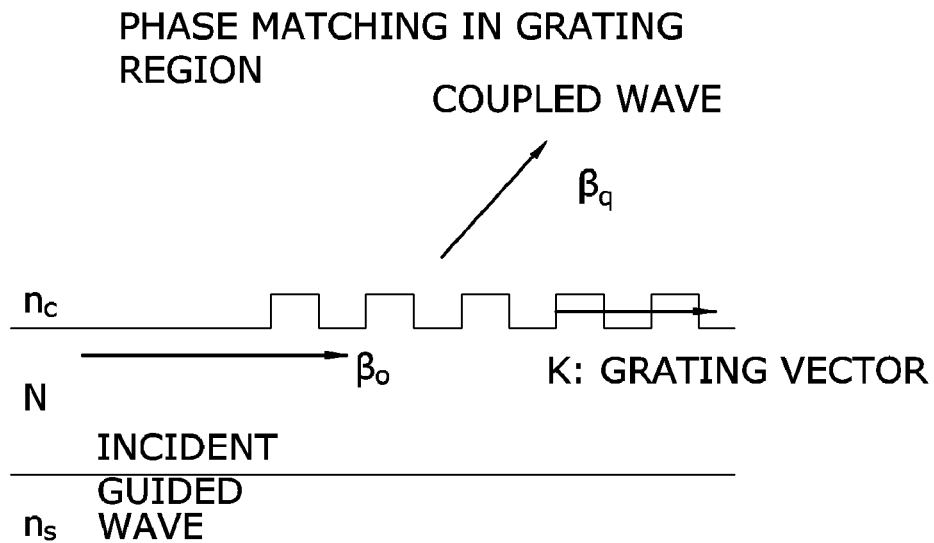
WAVE VECTOR DIAGRAM
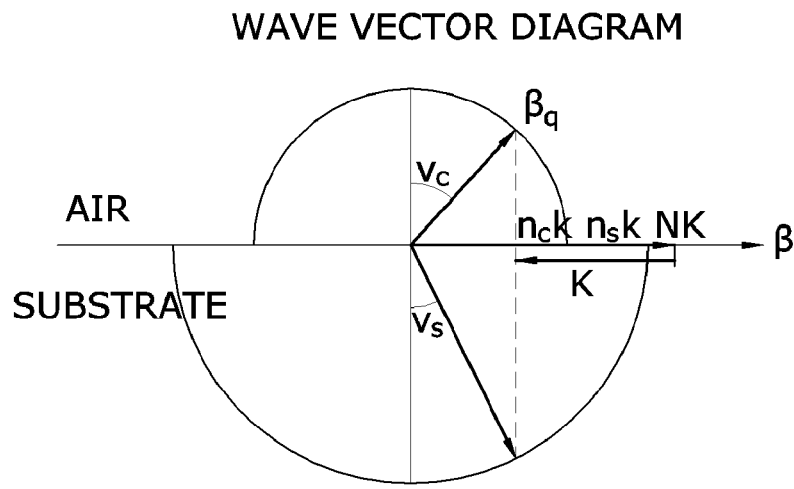
$$\beta_q = \beta_0 + qk \, (q=0, \pm 1, \pm 2, \ldots)$$

DIRECTIONAL BACKLIGHT UNIT

CROSS-REFERENCE TO RELATED APPLICATIONS

This application claims priority under 35 U.S.C. § 119 to Korean Patent Application No. 10-2014-0173082, filed on Dec. 4, 2014, the disclosure of which is incorporated herein by reference in its entirety.

TECHNICAL FIELD

The present invention relates to a directional backlight unit, and more particularly, to a directional backlight unit having a color filter function.

BACKGROUND

Three-dimensional (3D) image display apparatuses are apparatuses that show different two-dimensional (2D) images to a left eye and a right eye of a user, thereby providing a 3D image that enables the user to feel a sense of three dimensions.

The 3D image display apparatuses are classified into a glasses type and a glasses-free type. 3D image display technologies based on the glasses-free type are technologies using directional backlight technology that irradiates backlight in a desired direction.

In a conventional directional backlight technology, a prior art reference (U.S. Pat. No. 8,743,038B2) discloses a directional backlight unit where a plurality of light sources disposed on a rear surface of a liquid crystal display (LCD) panel irradiate backlight (or white light) onto a specific region in a direct type.

In the prior art reference, since a specific region for allowing a user to view a 3D image through the LCD panel is fixed, two eyes of the user should be located in the specific region for viewing the 3D image. This denotes that when the user deviates from the specific region, the user cannot view the 3D image.

Moreover, the LCD panel disclosed in the prior art reference may include a color filter having a thin film type, for extracting three colors including red, green, and blue in units of one pixel by using the backlight (or the white light).

In reproducing a three-color 3D image, the color filter is a necessary element, and is a main element in terms of optical attenuation of the backlight (or the white light).

In another conventional directional backlight technology, another prior art reference (U.S. Patent No. 20120050148A1) discloses backlight technology using an edge type light source array.

The other prior art reference uses different light source arrays for showing images to left and right eyes of a viewer. For this reason, additional light source is needed.

Moreover, in the other prior art reference, even when a viewer is located at a position corresponding to a center of a screen, appropriate images are transferred to left and right eyes of the viewer, and for this reason, a position which enables the viewer to view a 3D image is limited. Also, such a method needs a color filter for RGB color division from backlight, causing optical attenuation of the backlight (or white light).

SUMMARY

Accordingly, the present invention provides a directional backlight unit having a color filter function, which irradiates backlight onto an arbitrary region and does not need a design of a color filter.

In one general aspect, a backlight unit includes: a source light unit configured to generate dot source light; a linear source light generator configured to separate a plurality of source lights, which are output in a direction vertical to a line type output surface, from the dot source light according to different grating periods and generate the separated plurality of source lights as linear source lights, the linear source light generator including an incident surface on which the dot source light is incident and the line type output surface on which a plurality of grating patterns having the different grating periods are provided; and a light guide panel configured to output backlight, which has a form of flat source lights and includes the plurality of source lights, in a direction vertical to a plate type output surface according to the different grating periods, the light guide panel including an incident surface on which the linear source lights are incident simultaneously and the plate type output surface on which a plurality of grating patterns having the different grating periods are provided.

In another general aspect, a backlight unit includes: a first grating coupler configured to separate and generate red light, green light, and blue light, which are output in a direction vertical to a line type output surface, from white light according to different grating periods, the first grating coupler including the line type output surface on which a plurality of grating patterns having the different grating periods are provided; and a second grating coupler configured to generate backlight including red light, green light, and blue light which are output in a direction vertical to a plate type output surface according to different grating periods, the second grating coupler including the plate type output surface on which a plurality of grating patterns which are the same as the plurality of grating patterns provided on the line type output surface of the first grating coupler are provided.

Other features and aspects will be apparent from the following detailed description, the drawings, and the claims.

BRIEF DESCRIPTION OF THE DRAWINGS

FIG. 1 is a diagram for describing a grating coupler applied to the present invention.

DETAILED DESCRIPTION OF EMBODIMENTS

Figure 2:
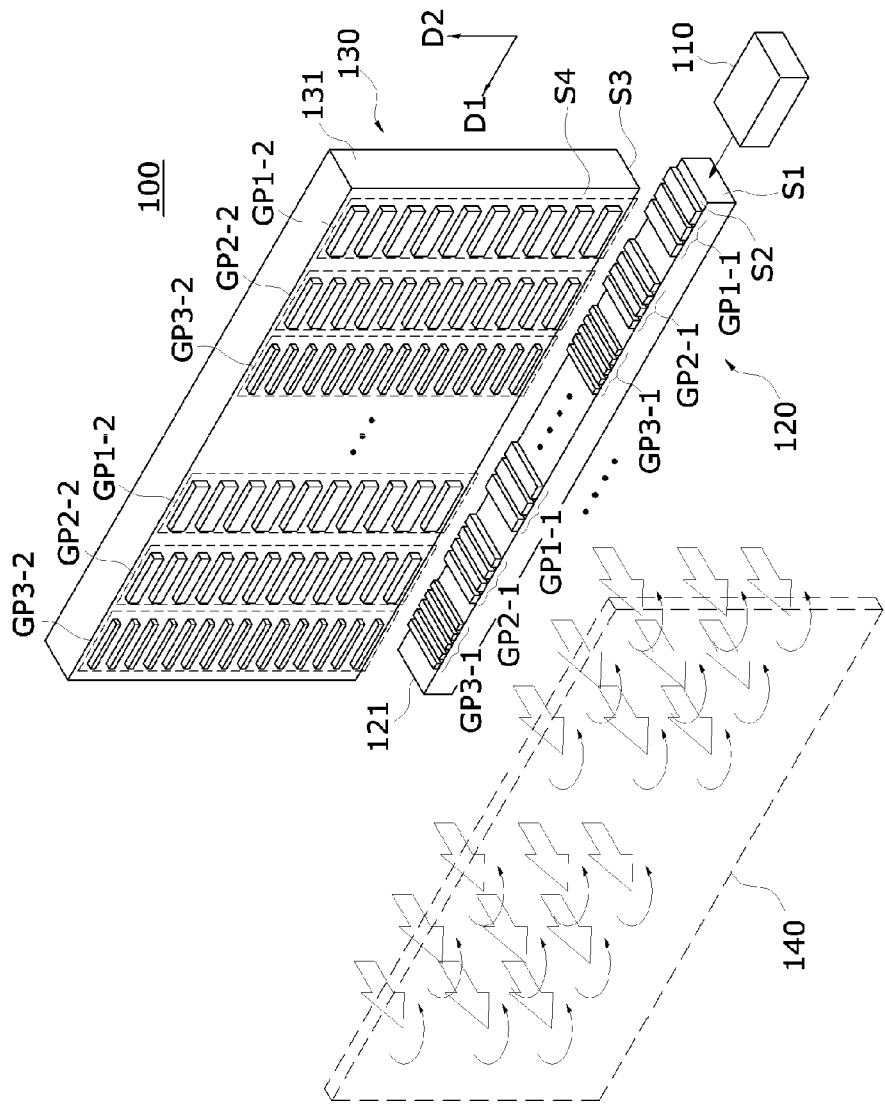
FIG. 2 is a diagram three-dimensionally illustrating a configuration of a backlight unit according to an embodiment of the present invention.

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In exemplary embodiments of the present invention, a directional backlight unit suitable for a display apparatus that displays a 3D image will be described. A backlight unit according to embodiments of the present invention may include a linear source light generator, having a grating structure (or a grating pattern) well known as a grating coupler, and a light guide panel.

Due to such a grating structure, the backlight unit according to embodiments of the present invention may perform a color filter function of separating three colors, including red, green, and blue, from white light.

Moreover, the backlight unit according to embodiments of the present invention may include a beam steering film which is disposed in front of the light guide panel, and may adjust an output direction backlight to an arbitrary direction.

Since the backlight unit according to embodiments of the present invention adjusts an output direction backlight to an arbitrary direction, the backlight is not irradiated onto an undesired region, thereby reducing power.

Moreover, the backlight unit according to embodiments of the present invention may autonomously perform the color filter function, and thus, a design of a color filter is excluded from a display panel configuring a display apparatus. Accordingly, the manufacturing cost and optical attenuation of the color filter are reduced.

Hereinafter, exemplary embodiments of the present invention will be described in detail with reference to the accompanying drawings.

First, in order to help understand embodiments of the present invention, a grating coupler applied to a directional backlight unit according to embodiments of the present invention will be briefly described.

FIG. 1 is a diagram for describing a grating coupler applied to the present invention.

Referring to FIG. 1, the grating coupler applied to the present invention may be an element that couples a guided mode of a thin film waveguide to an optical beam in a free space or separates the optical beam from the guided mode, and may have a grating structure (or a concave-convex grating pattern) that causes a refractive index to periodically occur in a thin film. In this case, the guided mode and the optical beam in the free space may have a relationship expressed in the following Equation (1):

$$\Lambda = \frac{q^\lambda}{n_c \sin\theta_q^c - N} \quad (1)$$

where $n_c$ denotes the refractive index in the free space, N denotes a refractive index in the guided mode, $\Lambda$ denotes a period of a grid, q denotes an arbitrary constant, $\theta_q^c$ denotes an angle between output light and a vertical direction of a grating period pattern, and $\lambda$ denotes a wavelength of an optical beam.

As seen in Equation (1), it can be seen that an output direction of light output from the grating coupler is determined based on a grating period of a grating pattern, a wavelength, and a refractive index of incident light.

This denotes that the light output from the grating coupler has clear directionality. Therefore, a backlight unit to which the grating coupler is applied may function as a directional backlight unit.

Moreover, since an output direction of light output from the grating coupler is determined based on a grating period of a grating pattern, a wavelength, and a refractive index of incident light, the output light having a specific wavelength and a directionality of the light which is output in a specific direction may be separated from the incident light, based on the grating period of the grating pattern.

When red light, green light, and blue light are output in the same specific direction by the grating coupler, grating periods of grating patterns for allowing the red light, the green light, and the blue light to be output in the specific direction may differ.

Based on such a feature, the present invention proposes a directional backlight unit having a color filter function, which separates red light, green light, and blue light, which are output in a specific direction, from white light by using a grating pattern having three different grating periods.

Figure 3:
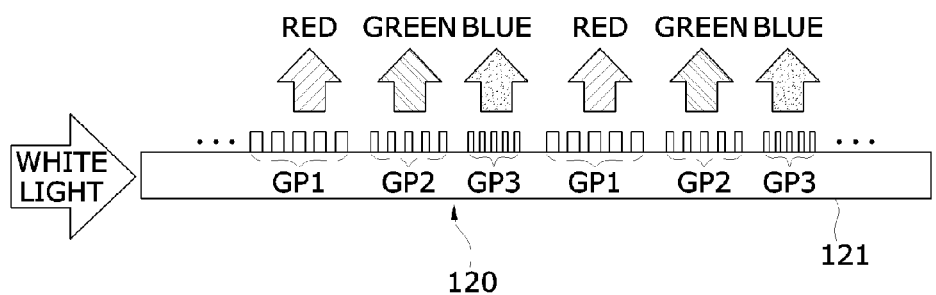
FIG. 3 is a diagram illustrating output directions of red source light, green source light, and blue source light separated by a linear source light generator illustrated in FIG. 2.
Figure 4:
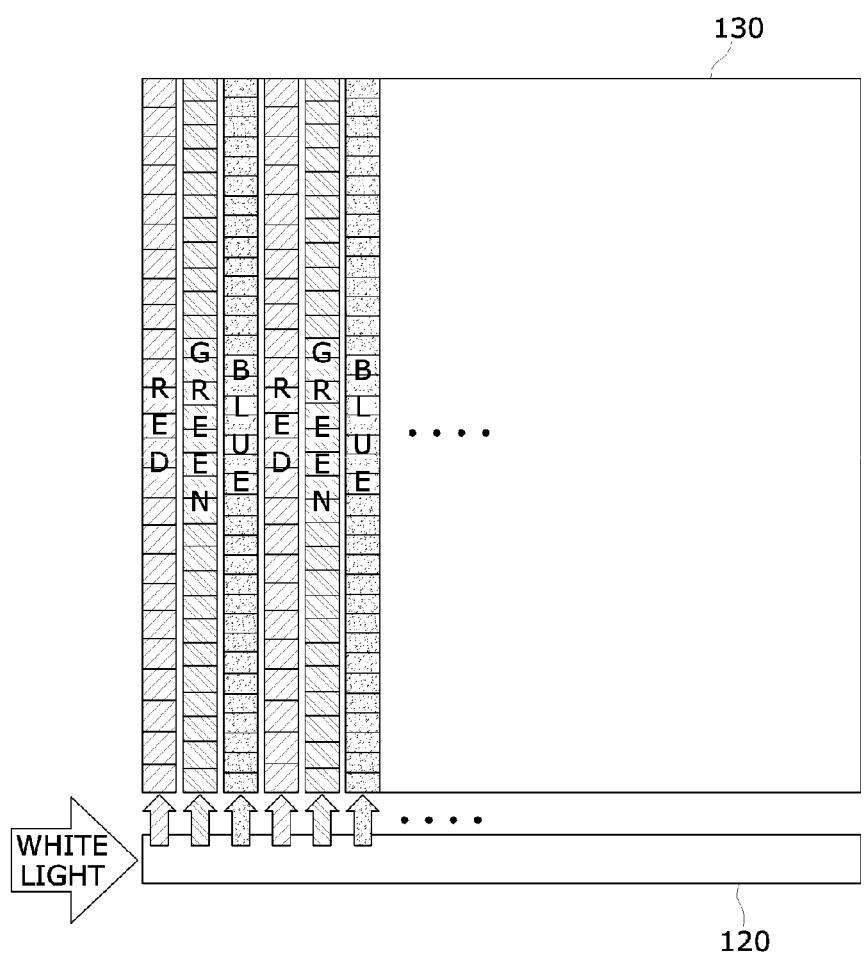
FIG. 4 is a diagram illustrating backlight including red source light, green source light, and blue source light which are output in a striped type from a light guide panel illustrated in FIG. 2.

FIG. 2 is a diagram three-dimensionally illustrating a configuration of a backlight unit 100 according to an embodiment of the present invention. FIG. 3 is a diagram illustrating output directions of red source light, green source light, and blue source light separated by a linear source light generator illustrated in FIG. 2. FIG. 4 is a diagram illustrating backlight including red source light, green source light, and blue source light which are output in a striped type from a light guide panel illustrated in FIG. 2.

Referring to FIG. 2, the backlight unit 100 according to an embodiment of the present invention may include a source light unit 110, a linear source light generator 120, a light guide panel 130, and a beam steering film 140.

The source light unit 110 may generate a dot source light. The dot source light may be white light.

The linear source light generator 120 may separate red source light, green source light, and blue source light from the dot source light to generate linear source light including the separated red source light, green source light, and blue source light.

The linear source light generator 120 may be implemented with a line type grating coupler, for separating the red source light, the green source light, and the blue source light from the dot light source.

In order to implement the linear source light generator 120 by using the line type grating coupler, the linear source light generator 120 may include a body 121 which includes a side surface S1 and an upper surface S2 having a line type.

The dot source light may be incident on the side surface S1 from the source light unit 110, and a plurality of grating patterns having different grating periods may be provided on the upper surface S2.

The plurality of grating patterns may include 1-1st to 3-1st grating patterns GP1-1 to GP3-1, and first to third grating patterns GP1 to GP3 may be repeatedly provided on the upper surface S2.

The 1-1st grating pattern GP1-1 may include a plurality of projection patterns having a first grating period, and red light which is output in a second direction D2 vertical to a first direction D1 may be separated from white light which is incident through the side surface S1, based on the first grating period.

The 2-1st grating pattern GP2-1 may include a plurality of projection patterns having a second grating period, and green light which is output in the second direction D2 may be separated from the white light, based on the first grating period.

The 3-1st grating pattern GP3-1 may include a plurality of projection patterns having a third grating period, and green light which is output in the second direction D2 may be separated from the dot source light, based on the third grating period.

A grating period which is defined in each of grating patterns may be defined as a length from a start position of a projection pattern to a start position of a next projection pattern and may be differently set by adjusting a width of a projection pattern or an interval between adjacent projection patterns.

Since the 1-1st to 3-1st grating patterns GP1-1 to GP3-1 are repeatedly provided on the upper surface S2, a plurality of red source lights, a plurality of green source lights, and a plurality of blue source lights may be separated from white light.

As illustrated in FIG. 3, the separated plurality of red source lights, the separated plurality of green source lights, and the separated plurality of blue source lights may be simultaneously output in a vertical direction, and thus, linear source light including a plurality of red source lights, linear source light including a plurality of green source lights, and linear source light including a plurality of blue source lights may be separated from the white light through color division.

The light guide panel 130 may output backlight which includes red light, green light, and blue light and has the form of flat source lights, based on the linear source light generated from the linear source light generator 120. In this case, the grating coupler structure applied to the linear source light generator 120 may be applied to the light guide panel 130, and thus, the backlight which includes the red light, the green light, and the blue light may be output.

To this end, the light guide panel 130 may include a body 131 which includes a side surface S3 and an upper surface S4 having a plate type.

The side surface S3 may face a side surface of the body 121 configuring the linear source light generator 120, and the upper surface S2 of the body 121 configuring the linear source light generator 120 may receive red source light, green source light, and blue source light which are output in a vertical direction.

A plurality of grating patterns, which are the same as the grating patterns provided on the upper surface of the body 121 configuring the linear source light generator 120, may be provided all over the upper surface S4.

In detail, a 1-2nd grating pattern GP1-2 which is provided at a position corresponding to the 1-1st grating pattern GP1-1 of the linear source light generator 120, a 2-2nd grating pattern GP2-2 which is provided at a position corresponding to the 2-1st grating pattern GP2-1 of the linear source light generator 120, and a 3-2nd grating pattern GP3-2 which is provided at a position corresponding to the 3-1st grating pattern GP3-1 of the linear source light generator 120 may be provided on the upper surface S4.

That is, the 1-2nd grating pattern GP1-2 may include a plurality of projection patterns which are arranged along an output direction of red linear source light which is separated from white light by the 1-1st grating pattern GP1-1 provided on the upper surface S2 of the body 121 configuring the linear source light generator 120. The 2-2nd grating pattern GP2-2 may include a plurality of projection patterns which are arranged along an output direction of green linear source light which is separated from the white light by the 2-1st grating pattern GP2-1 provided on the upper surface S2 of the body 121 configuring the linear source light generator 120. Similarly, the 3-2nd grating pattern GP3-2 may include a plurality of projection patterns which are arranged along an output direction of blue linear source light which is separated from the white light by the 3-1st grating pattern GP3-1 provided on the upper surface S2 of the body 121 configuring the linear source light generator 120.

Moreover, grating periods of the 1-2nd to 3-2nd grating patterns GP1-2 to GP3-2 may be the same as grating periods of the 1-1st to 3-1st grating patterns GP1-1 to GP3-1, respectively. The 1-2nd to 3-2nd grating patterns GP1-2 to GP3-2 may be repeatedly provided in the first direction D1 on the upper surface S4.

Therefore, as illustrated in FIG. 4, red linear source light, green linear source light, and blue linear source light which have a striped shape may be output in a direction vertical to the upper surface S4.

As described above, the linear source light generator 120 and the light guide panel 130 may each be designed as a grating coupler having the same grating pattern, and thus may each perform a color filter function of separating lights of three colors, including red, green, and blue, from white light.

Backlight including red linear source light, green linear source light, and blue linear source light having a striped shape may be output a direction vertical to the upper surface of the light guide panel 130, and thus, the beam steering film 120 may be disposed in front of the light guide panel 130, for adjusting an output direction of the backlight.

The beam steering film 120 may be implemented in an electro-wetting structure or a liquid crystal structure, and a direction of backlight may be adjusted by using an electric field.

As described above, the grating coupler having a grating pattern having different grating periods may be applied to the directional backlight unit according to an embodiment of the present invention, and thus, red light, green light, and blue light may be separated from white light.

By applying the grating coupler structure to the linear source light generator and the optical waveguide, the directional backlight unit according to an embodiment of the present invention may have the color filter function.

If a grating period of a grating pattern provided in the optical waveguide according to an embodiment of the present invention is manufactured according to a pixel size of a display screen, the color filter function may be performed by using only the directional backlight unit according to an embodiment of the present invention even without using a separate color filter.

Moreover, since the beam steering film is disposed in front of the light guide panel so as to adjust an output direction of the backlight, the output direction of the backlight may be adjusted.

The configuration and the method according to the above-described embodiments are not restrictively applied to the directional backlight unit according to the embodiments of the present invention, and all or some of the embodiments may be optionally combined in order for the embodiments to be variously modified.

As described above, in the backlight unit according to the embodiments of the present invention, a backlight output direction may be adjusted to an arbitrary direction, and thus, a user may view a 3D image from the arbitrary region.

Moreover, according to the embodiments of the present invention, the backlight unit may autonomously perform the color filter function, and thus, a design of a color filter is not needed in a display panel. Accordingly, the cost and optical attenuation caused by the design of the color filter are reduced.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A backlight unit comprising:
a source light unit configured to generate white light;
a linear source light generator including a first incident surface on which the white light is incident and a line type output surface on which a first plurality of grating patterns are arranged in a first direction, the linear source light generator configured to separate the white light into red light, green light, and blue light using the first plurality of grating patterns, the first plurality of grating patterns including first, second, and third grating patterns that respectively have first, second, and third grating periods, the first grating pattern, the second grating pattern, and the third grating pattern outputting the separated red light, the separated green light, and the separated blue light, respectively, in a second direction perpendicular to the line type output surface; and
a light guide panel including a second incident surface on which the separated red light, the separated green light, and the separated blue light are incident and a plate type output surface on which a second plurality of grating patterns having different grating periods are provided, the light guide panel configured to output backlight using the second plurality of grating patterns.

2. The backlight unit of claim 1, further comprising: a beam steering film disposed in front of the light guide panel to adjust an output direction of the backlight according to an electric field.

3. The backlight unit of claim 1, wherein each of the first, second, and third grating patterns includes a plurality of projection patterns, each of the plurality of projection patterns protruding from the line type output surface of the linear source light generator, and
wherein the first, second, and third grating periods are differently set by adjusting a width of a projection pattern or an interval between adjacent projection patterns.

4. The backlight unit of claim 1, wherein the first grating pattern, the second grating pattern, and the third grating pattern are repeatedly provided on the line type output surface.

5. The backlight unit of claim 1, wherein the red light, the green light, and the blue light are first red light, first green light, and first blue light, respectively, and
wherein the second plurality of grating patterns provided on the plate type output surface comprise:
a fourth grating pattern including a first plurality of projection patterns which are provided based on the first grating period, the fourth grating pattern outputting second red light in a third direction perpendicular to the plate type output surface;
a fifth grating pattern including a second plurality of projection patterns which are provided based on the second grating period, the fifth grating pattern outputting second green light in the third direction perpendicular to the plate type output surface; and
a sixth grating pattern including a third plurality of projection patterns which are provided based on the third grating period, the sixth grating pattern outputting second blue light in the third direction perpendicular to the plate type output surface.

6. The backlight unit of claim 5, wherein the fourth grating pattern, the fifth grating pattern, and the sixth grating pattern are repeatedly provided on the plate type output surface.

7. The backlight unit of claim 1, wherein the line type output surface of the linear source light generator is perpendicular to the second direction, and
wherein the plate type output surface of the light guide panel is perpendicular to the first direction and the second direction.

8. The backlight unit of claim 1, wherein the second plurality of grating patterns includes fourth, fifth, and sixth grating patterns respectively having the first, second, and third grating periods.

9. The backlight unit of claim 8, wherein the red light, the green light, and the blue light are first red light, first green light, and first blue light, respectively, and
wherein the fourth grating pattern, the fifth grating pattern, and the sixth grating pattern of the light guide panel output second red light, second green light, and second blue light, respectively, in a third direction perpendicular to the plate type output surface of the light guide panel, each of the second red light, the second green light, the second blue light having a stripe shape.

10. A backlight unit comprising:
a first grating coupler including a line type output surface on which a first plurality of grating patterns are arranged in a first direction, the first grating coupler configured to separate white light into red light, green light, and blue light using the first plurality of grating patterns, the first plurality of grating patterns including first, second, and third grating patterns respectively have first, second, and third grating periods, the first grating pattern, the second grating pattern, and the third grating pattern outputting the separated red light, the separated green light, and the separated blue light, respectively, in a second direction perpendicular to the line type output surface; and
a second grating coupler including a second incident surface on which the separated red light, the separated green light, and the separated blue light are incident and a plate type output surface on which a second plurality of grating patterns having the same configuration as the first plurality of grating patterns are provided, a light guide panel outputting backlight using the second plurality of grating patterns.

11. The backlight unit of claim 8, further comprising: a beam steering film disposed in front of the second grating coupler to adjust an output direction of the backlight according to an electric field.

* * * * *